UNITED STATES PATENT OFFICE.

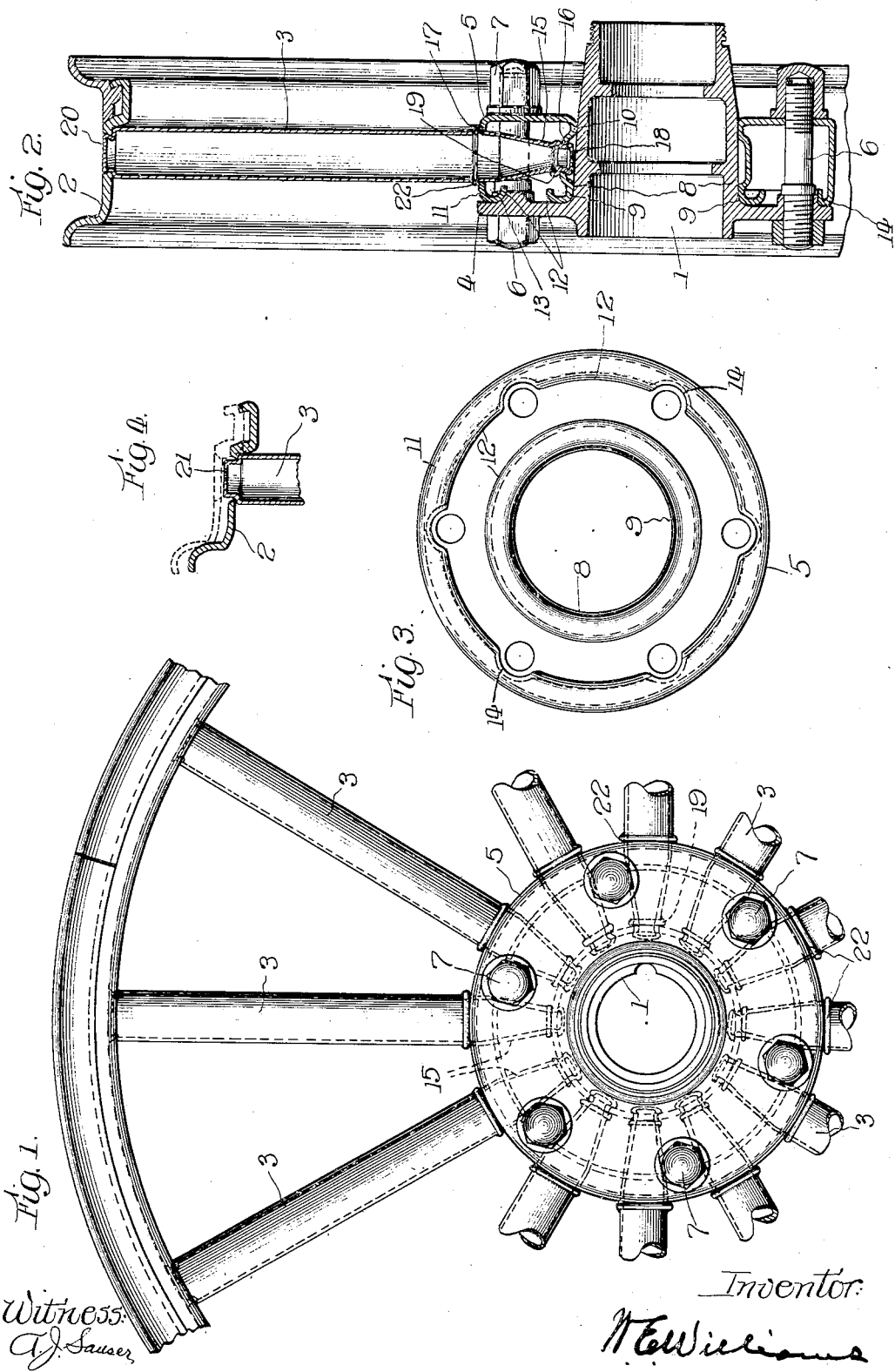

WILLIAM ERASTUS WILLIAMS, OF CHICAGO, ILLINOIS.

DEMOUNTABLE TUBULAR SPOKED WHEEL.

1,410,047. Specification of Letters Patent. Patented Mar. 21, 1922.

Application filed June 23, 1921. Serial No. 479,945.

*To all whom it may concern:*

Be it known that I, WILLIAM ERASTUS WILLIAMS, a citizen of the United States, a resident of Chicago, in the county of Cook and State of Illinois, have invented a new and useful Improvement in Demountable Tubular Spoked Wheels, of which the following is a specification.

My invention relates to wheels which are demounted at the hub in quick tire changes in automobile service and the object of the invention is to furnish a metallic tubular spoke wheel that will be very light, strong, cheaply made and readily mounted and demounted and be secure at all times in service.

Reference will be had to the accompanying drawings in which Figure 1 is a front elevation of a part of the wheel.

Figure 2 is a side sectional elevation.

Figure 3 is a rear elevation of the demountable hub ring.

Figure 4 is a detail showing a step in the fastening of the spokes into the rim.

In the drawing 1 indicates the hub of an ordinary automobile wheel as relates to the internal bearings thereof, 2 a tire rim here being indicated as of the type known as quick detachable, 3 the spoke made of tubular metal having the special fastenings for the spokes in the hub ring and in the rim, 4 an integral flange of the hub and 5 a demountable ring preferably made of pressed steel, but may be made of any suitable material. This ring 5 is secured to the flange 4 of the hub by stud bolts 6 having special demounting nuts 7 on the outside for use in demounting the wheel in tire changes. The rim, spokes and hub ring 5 are demounted as a unit through the medium of the clamping and releasing nuts 7 of the studs 6.

The hub barrel 8 is slightly tapered and the inner flange of the ring 5 as indicated by 9 is smaller than the front flange 10 to fit this tapered bearing 8 on the hub barrel. The ring 5 I prefer to make with one open side which permits its being made of a stamping and that open side is the side which is clamped up against the flange 4 of the hub and to stiffen the edges of the outer wall 11 and the inner wall at the flange 9 of this ring 5 I curl in the edges as is indicated by 12.

However, I may as desired, close in this side of the ring 5. The curled edges 12 are seated in little curved seats in the hub flange 4 and these seats are indicated by 13 for the main portion thereof and 14 where it passes by one of the stud bolts 6, as at this point the curled in flange 12 on the upper inside flange of the ring 5 must be turned a little sharper to clear the boss for the screw 6.

The tubular spokes 3 have their ends swaged down in conical shape, thickening the walls of the tube as the ends get smaller in diameter as is indicated by 15 and there is formed on this conical end of each tube an annular shoulder 19. The main body of the tubular spoke is pressed into an aperture 17 in the outer wall of the ring 5 and small shoulders 22 are swaged into the body of the spokes and bear on the ring 5. The spokes are pressed tightly into this ring 5 and when home the inner ends of the spokes are swaged over as indicated by 18, thus firmly fixing the tubular spokes into the ring 5. The spokes are first made with their outer ends as indicated by 21 in Figure 4 and the rim 2 is made larger in diameter as indicated by the dotted lines for the rim in Figure 4. Thus the spider, consisting of the ring 5 and spokes 3 are set into the rim 2 when at this larger diameter and then the rim 2 is upset and made smaller in diameter and thus pushed home to the right size on to the ends of the spokes and the ends of the spokes 21 are pressed down into the shape indicated by 20 in Figure 2.

The method of fastening the spokes into the ring 5 forming a structurally strong spider and then by a secondary compression when the rim is applied to the spokes furnishes a secure and light wheel adapted for ready separation of the hub from the other portions.

The ring 5 amounts to a secondary hub and for some uses might be sufficient for all the service that a hub is required to perform and I refer to this in the claims as the secondary hub.

The hub ring 5 or secondary hub may be termed an annular channel member, the front or outer face of which may be termed the web of the channel member and against this the nuts 7 press, while the outer periphery of the ring may be termed one leg of the channel member and the inner wall which forms the inner aperture, the other leg of the channel member, and I refer to this structure as a channel in the claims.

What I claim is:—

1. In a wheel of the class described, a main hub for mounting upon the axle of the vehicle, a secondary hub composed of a box section having perforations on the outer peripheral wall and perforations on the inner peripheral wall and a series of tubular spokes having conical ends pressed into the said perforations and permanently seated therein; in combination with a rim secured to the ends of the spokes.

2. In a wheel of the class described, the main hub adapted to fit upon the axle of the vehicle, a secondary hub secured to the main hub in demountable fashion, a series of tubular spokes having conical ends secured into the secondary hub, and a rim mounted on the ends of the said spokes.

3. In a wheel of the class described, a main hub and a secondary hub secured to the main hub in demountable fashion, said secondary hub composed of a boxed-in section with a series of tubular spokes having conical ends and the small end of each tube secured on the inner wall of the box section and the undiminished part of the tube in the outer wall of the box section.

4. In a wheel of the class described, a main hub adapted to be carried on the axle, a wheel flange on the said hub, a secondary hub secured to the main hub by means of a series of bolts secured to the flange of the main hub, with a series of tubular spokes having circular conical shaped ends pressed radially into the said secondary hub in the spaces between the said bolts and with a suitable rim secured to the ends of the said spokes.

5. In a wheel of the class described, a main hub and a secondary hub, and the secondary hub composed of a ring substantially in channel shape cross section and with the ends of the flanges of the channels curled in for added strength; in combination with a series of spokes secured in the flanges of the channel section by means of the spokes passing through the perforations in the channel wall member.

6. In a wheel of the class described, a main hub and a secondary demountable hub and the latter being in channel cross section having its web on the front face and the spokes secured into the flanges of the channel.

7. In a wheel of the class described, a main hub and a secondary hub secured to the main hub in demountable fashion, and the said demountable hub having an outer peripheral wall substantially parallel to the axis of the wheel and an inner peripheral wall bearing on the hub barrel and each of the said walls having perforations adapted to receive the spokes, the perforations in the outer wall being larger in diameter than those on the inner wall and with tubular spokes secured in the said periphery of the said secondary hub.

8. In a wheel of the class described, a main hub and a secondary hub, said secondary hub composed of a box section, a series of tubular spokes having conical ends secured in perforations in the walls of the box section of the secondary hub, a series of bolts passing from side to side through the box section between the spokes and through a portion of the main hub for clamping the said box section secondary hub to the main hub.

Signed at Chicago, in the county of Cook and State of Illinois, this 13th day of June, 1921.

WILLIAM ERASTUS WILLIAMS.

Witnesses:
   B. J. BERNHARD,
   F. M. ZOBEL.